United States Patent
Kambayashi

(10) Patent No.: US 7,390,138 B2
(45) Date of Patent: Jun. 24, 2008

(54) BALLPOINT PEN

(75) Inventor: Hironobu Kambayashi, Isesaki (JP)

(73) Assignee: Kabushiki Kaisha Pilot Corporation, Tokyo (JP)

(*) Notice: Subject to any disclaimer, the term of this patent is extended or adjusted under 35 U.S.C. 154(b) by 0 days.

(21) Appl. No.: 11/976,897

(22) Filed: Oct. 29, 2007

(65) Prior Publication Data

US 2008/0101849 A1    May 1, 2008

(30) Foreign Application Priority Data

Oct. 31, 2006   (JP)   ............... 2006-296877

(51) Int. Cl.
*B43K 7/00*    (2006.01)
*B43K 7/08*    (2006.01)
*C09D 11/00*   (2006.01)

(52) U.S. Cl. ............... 401/209; 401/142; 106/31.13

(58) Field of Classification Search ............... 401/141, 401/142, 208, 209; 106/31.13, 31.25, 31.26; 523/161
See application file for complete search history.

(56) References Cited

U.S. PATENT DOCUMENTS

| | | | |
|---|---|---|---|
| 5,762,434 A * | 6/1998 | Nagashima et al. | 401/209 |
| 6,899,487 B2 * | 5/2005 | Fujii | 401/215 |
| 7,322,767 B2 * | 1/2008 | Asami | 401/216 |

FOREIGN PATENT DOCUMENTS

| | | |
|---|---|---|
| JP | A 52-123722 | 10/1977 |
| JP | A 55-084376 | 6/1980 |
| JP | B 01-039467 | 8/1989 |
| JP | A 06-212111 | 8/1994 |
| JP | A 11-293174 | 10/1999 |

* cited by examiner

*Primary Examiner*—David J Walczak
(74) *Attorney, Agent, or Firm*—Oliff & Berridge, PLC

(57) ABSTRACT

A ballpoint pen including: an ink accommodation cylinder; a ballpoint pen tip in which a ball is rotatably held, the pen tip being attached to a tip end of an ink-accommodation cylinder directly or through a tip holder; and ballpoint oil-based ink comprising at least a coloring agent, organic solvent, a lubricant comprising organic acid and phosphoric ester, and organic amine, the ink having ink viscosity at shearing speed 6.8 $\sec^{-1}$ of 500 to 6000 mPa·s (20° C.) and directly being accommodated in the ink-accommodation cylinder, wherein the ballpoint pen satisfies $2.5 \times 10^{-3} \geq Z \geq 1.0 \times 10^{-3}$ where ink amount per 1 $mm^2$ is Z $mg/mm^2$ which is calculated from $Y = X \times 10^5 \times Z$ where writing width of the ballpoint pen is X mm and ink consumption per 100 m is Y mg.

6 Claims, 1 Drawing Sheet

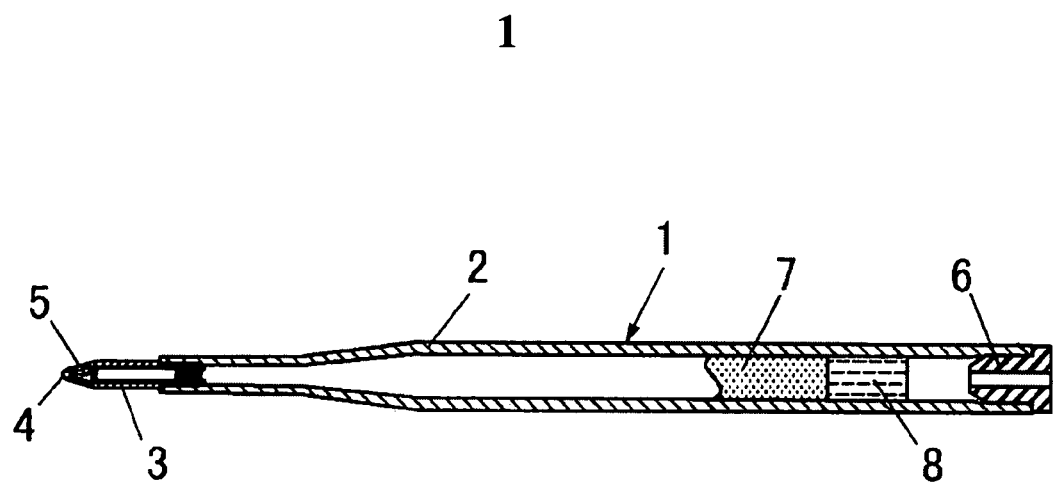

BALLPOINT PEN

BACKGROUND OF THE INVENTION

1. Field of the Invention

The present invention relates to a ballpoint pen, and more particularly, to a ballpoint pen accommodating ballpoint oil-based ink in an ink-accommodation cylinder.

2. Description of Related Art

A ballpoint pen has a ballpoint pen tip in which a ball is rotatably held. A conventionally known oil-based ink for such a ballpoint pen contains coloring agent, organic solvent, resin or the like, and its ink viscosity is in a range of 10000 to 30000 mPa·s (20° C.).

According to such conventional ballpoint oil-based ink, the ink viscosity is set to 10000 mPa·s or higher, a film is formed between the ball and a ball seat to reduce metal contact resistance between the ball and the ball seat, or lubricant or the like is used to enhance the lubricity, the contact resistance between the ball and the ball seat is reduced, and wear of the ball seat is suppressed. However, there is a problem that the lubricity is insufficient in a long-distance writing especially under high pressure, the ball seat is worn and writing performance is deteriorated.

In the conventional ballpoint pen accommodating the ballpoint oil-based ink, an amount of ink consumed when writing through 100 m is about 10 mg when its ball diameter on the tip end ob the ballpoint pen is $\phi 0.5$ mm, about 20 mg when the ball diameter is $\phi 0.7$ mm, and about 30 mg when the ball diameter is $\phi 1.0$ mm, and the amount of ink consumed is about 0.23 mm when the writing width is $\phi 0.5$ mm, about 0.28 when the writing width is $\phi 0.7$ mm and about 0.33 mm when the writing width is $\phi 1.0$ mm.

It seems possible to increase the writing density by increasing the consumption of ink, but the writing density is not increased merely by increasing the consumption of ink. This is because that the writing density and an ink amount per unit area have an intimate relation, and even if the ink consumption is the same, if the writing width is increased due to blur, the writing density is lowered.

According to the oil ballpoint pen, Z is usually smaller than $1.0 \times 10^{-3}$ wherein the ink consumption is Y mg, an amount of ink per 1 $mm^2$ is Z $mg/mm^2$, and $Y=X \times 1.0 \times 10^5 \times Z$. The conventional ballpoint pen is inferior in the writing density.

The present inventors studied the conventional oil ballpoint pen, and found that if Z is equal to or greater than $1.0 \times 10^{-3}$ (wherein writing width is X, the ink consumption per 100 m is Y and the ink amount per 1 $mm^2$ is Z), the writing density became higher than the conventional writing density and a written line became clear, and the inventors achieved the present invention.

To enhance the condition of the pen, it is conceived to lower the ink viscosity, but if the ink viscosity is merely lowered, although the condition of the pen is enhanced, since the film thickness between the ball and the ball seat becomes thin, there is a problem that the metal contact resistance between the ball and the ball seat can not be lowered, the ball seat is worn and the writing performance is deteriorated.

To solve the problems, it is well known to add lubricant into ballpoint oil-based ink composition to enhance the lubricant between the ball on the ballpoint pen tip and a tip body.

As ink for enhancing the lubricant, there is proposed ballpoint ink in which organic acid, non-alkali metallic salt of naphthenic acid, lanolin derivative, fluorine-based and/or silicone-based surfactant or nonyl phenol-based phosphoric ester is added as described in Japanese Patent Application Laid-open No. S52-123722 "ink", Japanese Patent Application Laid-open No. S 55-84376 "ballpoint pen ink", Japanese Patent Publication No. H1-39467 "ballpoint pen ink", and Japanese Patent Application Laid-open No. H11-293174 "oil-based ink composition and oil ballpoint pen".

Japanese Patent Application Laid-open No. H6-212111 "ballpoint oil-based ink composition" proposes a ballpoint oil-based ink composition which contains oleic acid and aliphatic amine, enhances lubricant and has little time degradation.

However, if the conventional organic acid, non-alkali metallic salt naphthenic acid, lanolin derivative, fluorine-based and/or silicone-based surfactant or nonyl phenol-based phosphoric ester is only used as the lubricant, there is a problem that such lubricant is not satisfactory as a ballpoint pen having lubricity under high writing pressure and excellent writing comfort, and stability is deteriorated with time.

If oleic acid and aliphatic amine are contained as in patent document 5, although time degradation can be suppressed, lubricity can not be maintained under high writing pressure and the writing comfort is not excellent.

SUMMARY OF THE INVENTION

It is an object of the present invention to provide a ballpoint pen which maintains lubricity also under a high writing pressure, suppresses wear of a ball seat, having excellent writing comfort and accommodates a ballpoint oil-based ink having excellent stability with time, and to provide the oil-based ink According to a first aspect of the present invention, there is provided a ballpoint pen comprising: an ink accommodation cylinder; a ballpoint pen tip in which a ball is rotatably held, the pen tip being attached to a tip end of an ink-accommodation cylinder directly or through a tip holder; and ballpoint oil-based ink comprising at least a coloring agent, organic solvent, a lubricant comprising organic acid and phosphoric ester, and organic amine, the ink having ink viscosity at shearing speed 6.8 $sec^{-1}$ of 500 to 6000 mPa·s (20° C.) and directly being accommodated in the ink-accommodation cylinder, wherein the ballpoint pen satisfies $2.5 \times 10^{-3} \geq Z \geq 1.0 \times 10^{-3}$ where ink amount per 1 $mm^2$ is Z $mg/mm^2$ which is calculated from $Y=X \times 10^5 \times Z$ where writing width of the ballpoint pen is X mm and ink consumption per 100 m is Y mg.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 1 is a vertical sectional view showing a ballpoint pen according to an embodiment 1.

DETAILED DESCRIPTION OF PREFERRED EMBODIMENT

To make a written line clear and to make writing comfort excellent, a first feature of the present invention is to satisfy $Y=X \times 10^5 \times Z$ and $2.5 \times 10^{-3} \geq Z \geq 1.0 \times 10^{-3}$ under the following conditions: ink viscosity at shearing speed 6.8 $sec^{-1}$ is in a range of 500 to 6000 mPa·s (20° C.), the writing width of the ballpoint pen is X mm, ink consumption per 100 m is Y mg, and an ink amount per 1 $mm^2$ is Z $mg/mm^2$.

If the ink viscosity at 20° C. and shearing speed of 6.8 $sec^{-1}$ exceeds 6000 mPa·s, the writing comfort is deteriorated, and if the ink viscosity is less than 500 mPa·s, it is difficult to suppress the wear. Therefore, the ink viscosity is set to 500 mPa·s or higher and 6000 mPa·s or lower, and more preferably 3000 mPa·s. Especially, in ink having extremely low viscosity not higher than 3000 mPa·s, a surface pressure load of the ball is prone to be applied and the wear of the ball seat proceeds and thus, the effect of the present invention is remarkable. The ink viscosity of the present invention is measured using a DV-II viscometer (No27 rotor) produced by Brookfield Engineering Laboratories, Inc. under the condition of shearing speed of 6.8 $sec^{-1}$ (revolution number of 20 rpm) at 20° C.

The writing density becomes high and clear if the ink amount Z $mg/mm^2$ per unit area is $1.0 \times 10^{-3}$ or higher under the following conditions: the writing width of the ballpoint pen is X mm, ink consumption per 100 m is Y mg, and an ink amount per 1 $mm^2$ is Z $mg/mm^2$. If the ink amount per unit area is excessively high, i.e., as high as $Z \geq 2.5 \times 10^{-3}$, the writing dryness is lowered. Therefore, it is necessary to use organic solvent having high volatility, and new constraint is introduced for composition. Thus, Z is preferably in a range of $2.5 \times 10^{-3} \geq Z \geq 1.0 \times 10^{-3}$, and more preferably in a range of $Z \geq 1.3 \times 10^{-3}$. Especially when the ball diameter is φ0.7 mm or less, especially φ0.5 mm or less, the writing width is small and the ink amount per unit area is small and thus, the effect of the present invention is remarkable.

A second feature of the invention is to also use lubricant comprising organic acid and phosphoric ester in combination.

This is because phosphoric ester remarkably enhances the lubricity but deteriorates stability with time and thus, organic acid which enhances the stability with time is also used although the effect for enhancing the lubricity is low, and a content of the phosphoric ester is reduced.

Examples of organic acid which can be used in the invention are oleic acid, stearic acid, ricinoleic acid and lauryl acid. Among the organic acid examples, it is most preferable to use other composition in the ballpoint oil-based ink composition, especially organic acid having effect for enhancing stability of dye with time.

Examples of phosphoric ester which can be used in the invention are tridecyl alcohol-based phosphoric ester, nonyl phenol-based phosphoric ester, styrene phenol-based phosphoric ester and lauryl alcohol-based phosphoric ester. If the phosphoric ester is added, anticorrosive effect of the ballpoint pen tip can also be exhibited.

Concrete examples of the phosphoric ester are Plysurf A212C, Plysurf A210G, Plysurf A207H, Plysurf AL, Plysurf A208B, Plysurf A208S, Plysurf A208F, Plysurf A212E, Plysurf A219B, Plysurf A206K, Plysurf A217E, Plysurf A215C, Plysurf A213B, Plysurf M208B and Plysurf M208F in Plysurf series (Dai-ichi Kogyo Seiyaku Co., Ltd.), and Phosphanol RE-210, Phosphanol RE-410, Phosphanol RE-510, Phosphanol RE-610, Phosphanol RE-710, Phosphanol RE-960, Phosphanol RS-410, Phosphanol RS-610, Phosphanol RS-710, Phosphanol RB-410, Phosphanol RM-410, Phosphanol RM-510, Phosphanol RM-710, Phosphanol RL-210, Phosphanol RD-510Y, Phosphanol RP-710, Phosphanol RA-600, Phosphanol BH-650, Phosphanol ML-200, Phosphanol GB-520 in Phosphanol series (TOHO Chemical Industry Co., LTD). They may be used alone or in combination.

If the total additive amount of lubricant comprising organic acid and phosphoric ester is less than 0.5% by mass of the entire ink consumption, lubricity is deteriorated by high pressure writing and thus, the wear of the ball seat is prone to proceed. If the total additive amount exceeds 12.0% by mass, the stability of ink with time is deteriorated and thus, it is preferable that the total additive amount is not less than 0.5% by mass and not more than 12.0% by mass.

If the additive amount of organic acid is less than 0.1% by mass of the entire ink consumption, the stability with time and lubricity are not enhanced so much, if the additive amount exceeds 10.0% by mass, the stability of ink with time is deteriorated and thus, it is preferable that the additive amount is not less than 0.1% by mass and not more than 10.0% by mass.

If the additive amount of phosphoric ester is less than 0.1% by mass of the entire ink consumption, the lubricity is not enhanced so much, wear of the ball seat under the high pressure writing is prone to proceed, the anticorrosive effect is inferior, and if the additive amount exceeds 3.0% by mass, the stability of ink with time is deteriorated and thus, it is preferable that the additive amount is not less than 0.1% by mass and not more than 3.0% by mass and more preferably not more than 1.0% by mass.

If the additive amount of organic acid is greater than the additive amount of phosphoric ester, the stability with time is deteriorated. Thus, the additive amount of organic acid is greater than that of phosphoric ester with respect to the entire amount of ink consumption.

A third feature of the invention is to enhance the stability with time by adding organic acid and organic amine into the ink consumption.

Since phosphoric ester is used as the lubricant in this invention, it is important to enhance the stability with time of phosphoric ester. For this purpose, it is most preferable to use one or more of alkyl amine such as lauryl amine, stearyl amine, oleyl amine, distearyl amine, dimethyl lauryl amine, dimethyl stearyl amine, dimethyl octyl amine, oxyethylene alkyl amine, and polyoxyethylene alkyl amine, as the organic amine while taking the stability with time of phosphoric ester into account.

Among the amine, oxyethylene alkyl amine and polyoxyethylene alkyl amine, primary amine reacts with other ink consumption such as phosphoric ester most strongly, and reaction of secondary amine with the other ink consumption is weaker, and reaction of tertiary amine with the other ink consumption is weaker. Thus, it is preferable to use secondary amine and/or tertiary amine while taking the stability of phosphoric ester with time into account, and it is most preferable to use tertiary amine having smallest reaction.

Concrete examples are Firmin 20D (primary amine), Firmin 80 (primary amine), Firmin D86 (secondary amine), Firmin DM2098 (tertiary amine), Firmin DM1098 (tertiary amine), Firmin DM8680 (tertiary amine) produced by Kao Corporation, and Nymeen L-201 (secondary amine), Nymeen L-202 (tertiary amine) and Nymeen L-207 (tertiary amine) produced by NOF Corporation.

If the additive amount of organic amine is greater than that of organic acid, the stability with time is deteriorated, and if the additive amount of phosphoric ester is greater than that of organic amine, the stability with time is deteriorated. Therefore, it is preferable that the additive amount of organic amine is smaller than that of organic acid and greater than that of phosphoric ester with respect to the total amount of ink consumption.

Therefore, it is preferable that the relation between organic acid, phosphoric ester and organic amine satisfies $A \geq C \geq B$ when a content of organic acid is A % by mass and a content of phosphoric ester is B % by mass and a content of organic amine is C % by mass with respect to the total amount of ink consumption.

In the case of the ballpoint oil-based ink, since the ink is basically transferred onto a paper sheet, the ink amount per unit area is increased as compared with the ink consumption but if viscosity is lowered to 500 to 6000 mPa·s (20° C.) to secure the writing comfort, there is a tendency that ink permeates into the paper sheet and a writing blur is generated. Therefore, even if the ink consumption is increased, there is an adverse possibility that increase in ink amount per unit area is reduced. Thus, it is preferable to contain high polymer resin having as high molecular weight as 100,000 or more to prevent permeation and blur.

Among the high polymer resin having as high molecular weight as 100,000 or more, it is most preferable to add polyvinyl pyrrolidone to suppress the ink drop. The polyvinyl pyrrolidone has cohesiveness, viscoelasticity and film-forming property and the polyvinyl pyrrolidone prevents the writing blur. Thus, it can be estimated that the polyvinyl pyrrolidone suppresses deterioration of the writing density. The polyvinyl pyrrolidone also provides the ink consumption with stringy property and prevents the ink drop.

Concrete examples of the polyvinyl pyrrolidone are PVP K-15, PVP K-30, PVP K-90, PVP K-120 (trade names) produced by ISP Japan Ltd.

Examples of organic solvent used in the invention are alcohol and glycol such as benzyl alcohol, diethylene glycol and polyethylene glycol, glycol ether such as ethylene glycol monophenyl ether, and organic solvent generally used as ballpoint oil-based ink. They may be used alone or in combination.

Example of ink viscosity adjusting agent are phenol resin, maleic resin, amide resin, xylene resin, hydride rosin resin, ketone resin and terpene resin, and pseudoplastic property giving agent such as organic acid amide and cross-linked acrylic acid polymer. They may be used alone or in combination. In addition, organic solvent or water of 10% by mass can be added, and viscosity can be adjusted.

The coloring agent may be dye and pigment and is not limited. As the dye, it is possible to employ dissolved dye, direct dye, acid dye, basic dye, auriferous dye, and various Halo dyes. Examples of pigment are inorganic pigment, organic pigment and processed pigment, and concrete examples are carbon black, aniline black, ultramarine blue, chrome yellow, titanium oxide, iron oxide, phthalocyanine-based, azo-based, quinacridon-based, quinophthalone-based, indanthrene-based, triphenylmethane-based, perynone-based, perylene-based, dioxazine-based, metallic pigment, pearl pigment, fluorescence pigment and glow pigment. These dyes and pigments may be used alone or in combination. It is preferable that the additive amount thereof is in a range of 1 to 50% by mass with respect to the total amount of ink consumption.

As other addition agents, it is possible to appropriately select pigment dispersing agent, pigment stabilizer and plasticizer.

Next, the present invention will be explained based on embodiments.

A ballpoint pen according to an embodiment 1 shown in FIG. 1 has an ink-accommodation cylinder 2. A stainless ballpoint pen tip 3 is attached to a tip end of the ink-accommodation cylinder 2 and a suitable end plug 6 is attached to an opposite end of the ink-accommodation cylinder. The ballpoint pen tip 3 rotatably holds a ball having a diameter of φ0.7 mm. Although a portion of the ballpoint pen is omitted in the drawing, a grease-like ink tracking body 8 is directly charged into a ballpoint oil-based ink 7 in which ink is mixed and a rear end of the ballpoint oil-based ink.

Examples of the ink-accommodation cylinder 2 are polypropylene, polyethylene (density: 0.955) and polytetrafluoroethylene, and the ink-accommodation cylinder 2 can be made from at least one kind selected from the above elements having the above-described characteristics, but if ink-resistance and forming property are taken into account, PP material is most preferable.

As the conventionally known grease-like ink tracking body 8 used for writing, it is possible to use at least one of hard-of-volatilizing organic liquid and nonvolatile liquid, more concretely, silicone oil, polybutene, mineral oil, biology and liquid paraffin as base oil, and appropriately add densing agent, plasticizer or resin.

More preferably, when ink viscosity is as low as 500 mPa·s or higher and 6000 mPa·s or lower at 20° C. and shearing speed 6.8 sec$^{-1}$, in order to prevent the ink from suspending down, a ball 4 which is rotatably held by the ballpoint pen tip is pressed against an inner wall of the tip end edge directly or through a pressing body by a coil spring 5, the ballpoint pen includes a valve mechanism which create a gap between the ball 4 and the inner wall of the tip end edge by a pressing force generated at the time of writing, and when the ballpoint pen is not used, a fine gap in a tip end is closed.

The ballpoint oil-based ink 7 employed a predetermined amount of oleic acid and phosphoric ester (Plysurf A-208N produced by Dai-ichi Kogyo Seiyaku Co., Ltd.) as organic solvent, dye and lubricant, and also employed a predetermined amount of polyvinyl pyrrolidone (PVP K-90 ISP produced by Japan Ltd.) as organic amine (NYMEEN L-201) and viscosity improver, they were heated to 60° C., they were completely dissolved using a dispersion dolly, and ballpoint oil-based ink was obtained. Concrete mixing amounts are shown in ink mixing 1 below. The ink viscosity was measured at shearing speed 6.8 sec$^{-1}$ (revolution number is 20 rpm) at 20° C. using a DV-II viscometer (No27 rotor) produced by Brookfield Engineering Laboratories, Inc. was measured and it was 900 mPa·s.

The calculation method of ink consumption (mg/100 m) per 100 m according to the present invention is calculated using a method in conformance with ISO12757-1, and writing width (mm) is an average numeric value in which the maximum value and the minimum value are removed while writing is actually measured (n=10).

Ink Mix 1 organic solvent (benzyl alcohol) . . . 36.5% by mass
organic solvent (phenyl glycol) . . . 21.0% by mass
lubricant (oleic acid) . . . 2.0% by mass
lubricant (phosphoric ester) . . . 1.0% by mass
organic amine (oxyethylene alkyl amine) . . . 1.0% by mass
stringy-providing resin (polyvinyl pyrrolidone) . . . 0.5% by mass
dye (SPILON BLACK-GMH-S) . . . 20.0% by mass
dye (VALIFAST VIOLET 1701) . . . 18.0% by mass

TABLE 1-1

| | | | \\multicolumn{8}{c}{Embodiment No.} |
|---|---|---|---|---|---|---|---|---|---|---|
| | | | 1 | 2 | 3 | 4 | 5 | 6 | 7 | 8 |
| organic solvent | | benzyl alcohol | 36.5 | 28.0 | 24.5 | 28.5 | 23.5 | 18.0 | 21.5 | 28.0 |
| | | phenyl glycol | 21.0 | 29.0 | 30.0 | 25.0 | 24.5 | 38.0 | 23.0 | 29.0 |
| lubricant | organic acid | oleic acid | 2.0 | | 3.0 | | 4.0 | | 7.0 | |
| | | stearic acid | | 2.0 | | 2.0 | | 2.0 | | 2.0 |
| | phosphoric ester | PLYSURF A210B | | 1.0 | | 2.0 | | 2.0 | | 1.0 |
| | | PLYSURF A208N | 1.0 | | 2.0 | | 3.0 | | 3.0 | |
| organic amine | oxyethylene alkyl amine | NYMEEN L-201 | 1.0 | 1.5 | | 2.0 | | 2.0 | | |
| | dimethyl decyl amine | FIRMIN DM1098 | | | 2.0 | | 3.0 | | 3.0 | |
| | polyoxyethylene alkyl amine | NYMEEN L-207 | | | | | | | | 1.5 |
| resin | stringy-providing resin | PVP K-90 | 0.5 | 0.5 | 0.5 | 0.5 | 0.5 | | 0.5 | 0.5 |
| | viscosity adjusting agent | HILACK 110H | | | | 2.0 | 3.5 | | 4.0 | |
| coloring agent | dye | SPILON BLACK-GMH-S | 20.0 | 20.0 | 20.0 | 20.0 | 20.0 | 20.0 | 20.0 | 20.0 |
| | | VALIFAST RED 1701 | 18.0 | 18.0 | 18.0 | 18.0 | 18.0 | 18.0 | 18.0 | 18.0 |

TABLE 1-2

| | | \\multicolumn{8}{c}{Embodiment No.} |
|---|---|---|---|---|---|---|---|---|---|
| | | 1 | 2 | 3 | 4 | 5 | 6 | 7 | 8 |
| ink viscosity (mPa·s) | shearing speed: 6.8 sec$^{-1}$ (20° C.: revolution speed of 20 rmp) | 900.0 | 1250.0 | 1500.0 | 1000.0 | 3000.0 | 1700.0 | 5000.0 | 1250.0 |
| | writing width (mm) | 0.29 | 0.29 | 0.28 | 0.29 | 0.28 | 0.29 | 0.28 | 0.29 |
| | ink consumption (mg/100 m) | 65.0 | 52.0 | 50.0 | 58.0 | 40.0 | 48.0 | 38.0 | 52.0 |
| | ink amount per unit area (×10$^{-3}$ mg/mm$^2$) | 2.24 | 1.79 | 1.79 | 2.0 | 1.43 | 1.66 | 1.36 | 1.79 |
| evaluation | high writing pressure test | A | A | A | A | A | B | A | A |
| | stability with time | B | B | A | B | A | B | A | B |
| | writing dryness | A | A | A | A | A | A | A | A |
| | writing density | A | A | A | A | A | A | A | A |

Embodiments 2 to 8

As shown in Tables 1-1 and 1-2, ingredients were changed and the ballpoint oil-based ink was obtained and except that, ballpoint pens of embodiments 2 to 8 were obtained in the same manner as that of the embodiment 1.

Comparative Examples 1 to 7

Ingredients of ink were as shown in Table 2, ballpoint oil-based ink was obtained in the same procedure as that of the ink mix 1 and except that, ballpoint pens of comparative examples 1 to 7 were obtained in the same manner as that of the embodiment 1. Tables 2-1 and 2-2 shows measurement and evaluation results.

TABLE 2-1

| | | | \\multicolumn{7}{c}{Comparative Example No.} |
|---|---|---|---|---|---|---|---|---|---|
| | | | 1 | 2 | 3 | 4 | 5 | 6 | 7 |
| | organic solvent | benzyl alcohol | 37.0 | 29.0 | 26.5 | 18.0 | 26.8 | 36.5 | 24.5 |
| | | phenyl glycol | 22.5 | 27.5 | 30.0 | 37.5 | 24.7 | 21.0 | 30.0 |
| lubricant | organic acid | oleic acid | | | 3.0 | | 3.0 | 2.0 | 3.0 |
| | | stearic acid | | 3.0 | | 2.0 | | | |
| | phosphoric ester | PLYSURF A210B | | | | | | | |
| | | PLYSURF A208N | 1.0 | | 2.0 | | | 1.0 | 2.0 |
| | polyether denatured silicon oil | KF354 | | | | 2.0 | | | |
| | polyoxyethylene oleate | NOIGEN ES-169 | | | | | 2.0 | | |
| organic amine | oxyethylene alkyl amine | NYMEEN L-201 | 1.0 | | | 2.0 | | 1.0 | |
| | dimethyl decyl amine | FIRMIN DM1098 | | 2.0 | | | | | 2.0 |
| | polyoxyethylene alkyl amine | NYMEEN L-207 | | | | | 3.0 | | |

TABLE 2-1-continued

| | | | Comparative Example No. | | | | | | |
|---|---|---|---|---|---|---|---|---|---|
| | | | 1 | 2 | 3 | 4 | 5 | 6 | 7 |
| resin | stringy-providing resin | PVP K-90 | 0.5 | 0.5 | 0.5 | 0.5 | 0.5 | 0.5 | 0.5 |
| | viscosity adjusting agent | HILACK 110H | | | | | 2.0 | | |
| coloring agent | dye | SPILON BLACK-GMH-S | 20.0 | 20.0 | 20.0 | 20.0 | 20.0 | 20.0 | 20.0 |
| | | VALIFAST RED 1701 | 18.0 | 18.0 | 18.0 | 18.0 | 18.0 | 18.0 | 18.0 |

TABLE 2-2

| | | Comparative Example No. | | | | | | |
|---|---|---|---|---|---|---|---|---|
| | | 1 | 2 | 3 | 4 | 5 | 6 | 7 |
| ink viscosity (mPa · s) | shearing speed: 6.8 sec$^{-1}$ (20° C.: revolution speed of 20 rmp) | 1100.0 | 1250.0 | 1500.0 | 2000.0 | 1000.0 | 900.0 | 1500.0 |
| | writing width (mm) | 0.29 | 0.29 | 0.28 | 0.28 | 0.29 | 0.29 | 0.28 |
| | ink consumption (mg/100 m) | 52.0 | 48.0 | 60.0 | 38.0 | 50.0 | 80.0 | 27.0 |
| | ink amount per unit area ($\times 10^{-3}$ mg/mm$^2$) | 1.79 | 1.66 | 2.14 | 1.36 | 1.72 | 2.76 | 0.96 |
| evaluation | high writing pressure test | C | D | B | D | D | A | A |
| | stability with time | C | A | C | B | A | B | A |
| | writing dryness | A | A | A | A | A | B | A |
| | writing density | A | A | A | A | A | A | B |

Test Method and Evaluation

The ballpoint oil-based ink shown in shown in Tables 1 and 2 was charged into ink-accommodation cylinder 2 of the ballpoint pen of the embodiment 1, ballpoint pens of the embodiments 1 to 8 and the comparative examples 1 to 7 were formed, the following tests were conducted and the ballpoint pens were evaluated.

High writing pressure test: the writing test was carried out using a running tester having a load of 500 gf and a writing angle of 70°, and the running speed was 4 m/min, and wears of ball seats were measured.
Wear of ball seat is 5 µm or less ... A
Wear of ball seat is 10 µm or less ... B
Wear of ball seat is 20 µm or more but it is possible to write ... C
Ball seat is worn badly and writing failure is caused ... D Stability with time test: ink was left for six months at room temperature, and the ink was observed by means of a microscope.
Excellent ink having no sludge ... A
Ink which has practically no problem although small sludge was generated ... B
Impractical ink having sludge ... C Writing dryness test: a line was written and after 20 seconds, the written line was rubbed and a degree of stain was evaluated.
No stain and excellent line ... A
Impractical line having stain ... B writing density: writing density after the writing test was evaluated.
Writing is density and excellent ... A
Writing is light ... B The embodiments 1 to 8 includes organic amine and lubricant comprising organic acid and phosphoric ester, and $Y=X \times 10^5 \times Z$ and $2.5 \times 10^{-3} \geq Z \geq 1.0 \times 10^{-3}$ are satisfied (wherein writing width of the ballpoint pen is X mm, ink consumption per 100 m is Y mg and ink amount per 1 mm$^2$ is Z mg/mm$^2$) and thus, results were excellent in each test.

Since the embodiments 3, 5, 7 and 8 had tertiary amine, stability with time was especially excellent.

Since the comparative example 1 did not have organic acid, sludge was generated in the stability with time test in some cases. In the high writing pressure test, there were faint lines in some cases.

In the comparative example 2, since phosphoric ester was not used, wear of ball seat proceeded in the high writing pressure test, and writing failure was generated in some cases.

In the comparative example 3, since organic amine was not included, sludge was generated in the stability with time test in some cases.

In the comparative examples 4 and 5, since lubricant other than phosphoric ester was used, wear of the ball seat proceeded in the high writing pressure test and writing failure was generated in some cases.

In the comparative example 6, $2.5 \times 10^{-3} < Y$ (wherein writing width of the ballpoint pen is X mm, ink consumption per 100 m is Y mg, ink amount per 1 mm2 is Z mg/mm$^2$ and $Z=X \times 10^5$). Therefore, writing dryness was inferior, if the written line after the writing test was rubbed, stain was generated and it was not practical. In the comparative example 7, since $Y > 1.0 \times 10^{-3}$, the writing comfort was inferior and writing density was low.

According to the embodiments of the present invention, it was possible to provide a ballpoint pen in which a ballpoint oil-based ink having excellent stability with time is accommodated, and in which lubricity was maintained also under the high writing pressure, wear of the ball seat was suppressed, and writing was excellent.

The present invention can widely be utilized as cap type or knock type ballpoint pens, the ballpoint pen using a ball of a small diameter as small as φ0.5 mm or less has a small contact area between the ball and the ball seat, a load applied to a unit area is high and the ball seat is prone to wear and thus, the invention can preferably be applied.

The entire disclosure of Japanese Patent Application No. 2006-296877 filed on Oct. 31, 2006 including description, claims, drawings, and abstract are incorporated herein by reference.

Although various exemplary embodiments have been shown and described, the invention is not limited to the embodiments shown. Therefore, the scope of the invention is intended to be limited solely by the scope of the claims that follow.

What is claimed is:

1. A ballpoint pen comprising:
an ink accommodation cylinder;
a ballpoint pen tip in which a ball is rotatably held, the pen tip being attached to a tip end of an ink-accommodation cylinder directly or through a tip holder; and
ballpoint oil-based ink comprising at least a coloring agent, organic solvent, a lubricant comprising organic acid and phosphoric ester, and organic amine, the ink having ink viscosity at shearing speed 6.8 sec$^{-1}$ of 500 to 6000 mPa·s (20° C.) and directly being accommodated in the ink-accommodation cylinder,
wherein the ballpoint pen satisfies $2.5 \times 10^{-3} \geqq Z \geqq 1.0 \times 10^{-3}$ where ink amount per 1 mm$^2$ is Z mg/mm$^2$ which is calculated from $Y = X \times 10^5 \times Z$ where writing width of the ballpoint pen is X mm and ink consumption per 100 m is Y mg.

2. The ballpoint pen according to claim 1, wherein a content of the organic acid is 0.1% by mass or higher and 10.0% by mass or lower with respect to a total ink mass, a content of the phosphoric ester is 0.1% by mass or higher and 3.0% by mass or lower with respect to the total ink mass, a total content of the lubricant is 0.5% by mass or higher and 12.0% by mass or lower with respect to the total ink mass.

3. The ballpoint pen according to claim 1, wherein the organic amine comprises one or more of alkyl amine, oxyethylene alkyl amine and polyoxyethylene alkyl amine.

4. The ballpoint pen according to claim 3, wherein the organic amine is secondary amine and/or tertiary amine.

5. The ballpoint pen according to claim 1, wherein the ballpoint oil-based ink satisfies $A \geqq C \geqq B$ where a content of the organic acid is A % by mass and a content of the phosphoric ester is B % by mass and a content of the organic amine is C % by mass with respect to a total ink mass.

6. The ballpoint pen according to claim 1, wherein the ballpoint oil-based ink includes polyvinyl pyrrolidone.

* * * * *